(12) United States Patent
Miller et al.

(10) Patent No.: US 9,797,213 B2
(45) Date of Patent: Oct. 24, 2017

(54) WELLBORE FLUIDS COMPRISING HYDRATED INORGANIC OXIDE MATERIALS AND ASSOCIATED METHODS

(71) Applicant: Halliburton Energy Services, Inc., Houston, TX (US)

(72) Inventors: Matthew L. Miller, Spring, TX (US); Robert J. Murphy, Kingwood, TX (US); Kay Ann Galindo, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 300 days.

(21) Appl. No.: 14/380,321

(22) PCT Filed: Oct. 22, 2013

(86) PCT No.: PCT/US2013/066032
§ 371 (c)(1),
(2) Date: Aug. 21, 2014

(87) PCT Pub. No.: WO2015/060815
PCT Pub. Date: Apr. 30, 2015

(65) Prior Publication Data
US 2016/0237772 A1 Aug. 18, 2016

(51) Int. Cl.
*E21B 33/02* (2006.01)
*C09K 8/40* (2006.01)
(Continued)

(52) U.S. Cl.
CPC .............. *E21B 33/02* (2013.01); *C09K 8/032* (2013.01); *C09K 8/40* (2013.01); *C09K 8/501* (2013.01);
(Continued)

(58) Field of Classification Search
None
See application file for complete search history.

(56) References Cited

U.S. PATENT DOCUMENTS 3,756,315 A * 9/1973 Suman, Jr. ............ C09K 8/5045
166/270
4,011,289 A * 3/1977 Noothout ................... B01J 2/08
149/114
(Continued)

FOREIGN PATENT DOCUMENTS

WO 2012162117 A1 11/2012
WO 2015060815 A1 4/2015

OTHER PUBLICATIONS

Geng et al.; Unusually stable ~100-fold reversible and instantaneous swelling of inorganic layered materials; Mar. 27, 2013; Nature Communications; pp. 1-21.*
(Continued)

*Primary Examiner* — Angela M DiTrani
*Assistant Examiner* — Anuradha Ahuja
(74) *Attorney, Agent, or Firm* — McDermott Will & Emery LLP

(57) ABSTRACT

A hydrated inorganic oxide material capable of elongating from a planar shape to a fiber shape along a thickness direction of the planar shape, wherein the fiber shape is at least about 25 times greater in the thickness direction than the planar shape, and wherein during elongating a radial dimension of the hydrated inorganic oxide material changes by less than about 10% may be useful in a plurality of wellbore operations. For example, a method may include introducing a wellbore fluid comprising an aqueous base fluid and a hydrated inorganic oxide material into a wellbore penetrating a subterranean formation; and swelling the hydrated inorganic oxide material by contacting the hydrated inorganic oxide material with a polar amine com-
(Continued)

pound such that the hydrated inorganic oxide material elongates from a planar shape to a fiber shape along a thickness direction of the planar shape.

19 Claims, 3 Drawing Sheets

(51) Int. Cl.
    *E21B 43/04*     (2006.01)
    *E21B 33/127*    (2006.01)
    *C09K 8/03*      (2006.01)
    *C09K 8/50*      (2006.01)
    *C09K 8/80*      (2006.01)

(52) U.S. Cl.
    CPC ............ *C09K 8/80* (2013.01); *E21B 33/1277* (2013.01); *E21B 43/04* (2013.01); *C09K 2208/08* (2013.01)

(56) References Cited

U.S. PATENT DOCUMENTS

| | | | |
|---|---|---|---|
| 4,990,268 A * | 2/1991 | Burba, III | C01B 13/363 252/184 |
| 6,889,766 B2 | 5/2005 | Creel et al. | |
| 7,287,586 B2 | 10/2007 | Everett et al. | |
| 2004/0244978 A1 * | 12/2004 | Shaarpour | C09K 8/035 166/293 |
| 2006/0234871 A1 * | 10/2006 | Dalrymple | C09K 8/428 507/211 |
| 2006/0289162 A1 | 12/2006 | Santra et al. | |
| 2007/0044963 A1 * | 3/2007 | MacDougall | E21B 33/13 166/278 |
| 2007/0227732 A1 * | 10/2007 | Miller | C09K 8/62 166/281 |
| 2008/0017376 A1 * | 1/2008 | Badalamenti | C04B 28/02 166/292 |
| 2009/0139710 A1 * | 6/2009 | Robisson | C08L 15/005 166/208 |
| 2009/0176667 A1 * | 7/2009 | Nguyen | C09K 8/70 507/204 |
| 2011/0098202 A1 | 4/2011 | James et al. | |
| 2012/0031612 A1 * | 2/2012 | Lembcke | C09K 8/516 166/278 |
| 2013/0146312 A1 * | 6/2013 | Gerrard | C09K 8/44 166/387 |

OTHER PUBLICATIONS

Geng et al., "Usually Stable ~100-Fold Reversible and Instantaneous Swelling of Inorganic Layered Materials," Nature Communications, 10.1038/ncomms2641, 2013.

International Search Report and Written Opinion for PCT/US2013/66032 dated Jul. 24, 2014.

* cited by examiner

WELLBORE FLUIDS COMPRISING HYDRATED INORGANIC OXIDE MATERIALS AND ASSOCIATED METHODS

BACKGROUND

The exemplary embodiments described herein relate to wellbore fluids comprising hydrated inorganic oxide materials capable of elongating from a planar shape to a fiber shape and wellbore operations associated therewith.

Wellbore fluids used in oil and gas exploration and production use a variety of additives to achieve a desired property for the fluid or to produce a desired result in the wellbore. One example of an additive that can serve many purposes is a swellable material. For example, in a swollen form, these materials can increase the viscosity of a wellbore fluid, which may allow for the suspension of higher concentrations of particles in the fluid. In another example, these materials may be placed in a permeable portion of the formation and swollen to plug or reduce fluid flow through that portion of the formation.

Many known materials are water-swellable. For example, water-swellable polymers are disclosed in U.S. Pat. No. 6,889,766, filed Feb. 27, 2003, issued May 10, 2005, entitled, "Methods For Passing A Swelling Agent Into A Reservoir To Block Undesirable Flow Paths During Oil Production," which is incorporated by reference in its entirety. Such water-swellable polymers possess the capacity to form gel masses that resist unwanted fluid flow through the formation. The resultant gel masses readily penetrate into fractures of a subterranean formation so long as they are appropriately sized. The size of the resultant gel masses depends on the particle size of the dry polymeric material prior to hydration. These properties allow the gelled polymer particles to be packed into the formation voids, forming a seal within the formation. The disclosed swelling agents may be selected from the group consisting of polyacrylamide, polyacrylate, hydrolyzed polyacrylonitrile, carboxylalkyl cellulose, carboxymethyl starch, salts of carboxymethyl cellulose, carboxyalkyl polysaccharide, and combinations thereof.

Similarly, U.S. Pat. No. 7,287,586 filed Feb. 1, 2005, issued Oct. 30, 2007, and entitled "Compositions and Methods for Plugging and Sealing a Subterranean Formation," discloses a composition for treating a subterranean formation, the composition comprising a water-swellable agent and a sealing agent. Preferably, the disclosed water-swellable agent absorbs greater than 100 weight % of water; and swells to greater than 100 weight % as it absorbs water. Preferably the sealing agent is greater than 0.01 weight % soluble in water; and forms a three dimensional gel structure in water. The disclosed swelling agents may be selected from the group consisting of crosslinked polyacrylamide, a crosslinked polyacrylate, a copolymer of acrylamide and acrylate monomers, a starch backbone grafted with acrylonitrile and acrylate, a polymer of two or more of allylsulfonate, 2-acrylamido-2-methyl-1-propane-sulfonic acid, 3-allyloxy-2-hydroxy-1-propane-sulfonic acid, acrylamide, and an acrylic acid monomer, and combinations thereof.

Other common swellable materials include minerals such as clay (e.g. bentonite). These known swellable materials generally swell in all directions and on the order of an about 5 to about 20 times increase in volume. However, swellable materials with different physical swelling properties (such as confining the majority of swelling to only one direction) may be useful in a variety of wellbore applications.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The exemplary embodiments described herein relate to wellbore fluids comprising hydrated inorganic oxide materials capable of elongating from a planar shape to a fiber shape and wellbore operations associated therewith.

In some embodiments, wellbore fluids may comprise an aqueous base fluid and a hydrated inorganic oxide material described herein. Aqueous base fluids suitable for use in the wellbore fluids described herein may comprise fresh water, saltwater (e.g., water containing one or more salts dissolved therein), brine (e.g., saturated salt water), seawater, and any combination thereof.

Figure 1:
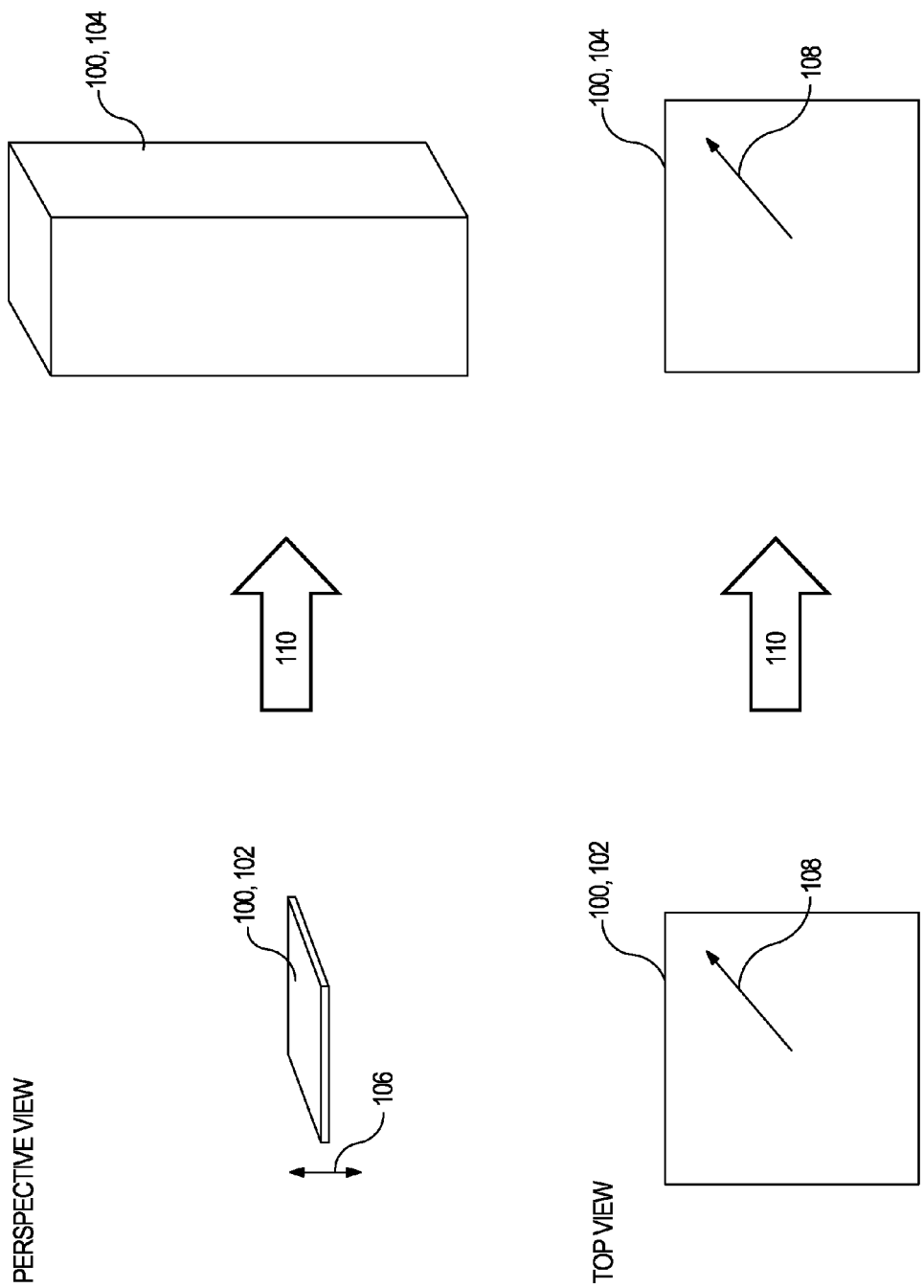
FIG. 1 provides an illustration in perspective view and top view of the elongation of the hydrated inorganic oxide materials described herein.

FIG. 1 provides an illustration in perspective view and top view of the elongation of the hydrated inorganic oxide materials described herein. Generally, the hydrated inorganic oxide materials 100 described herein are capable of elongating 110 from a planar shape 102 to a fiber shape 104 along the thickness direction 106, which is defined based on the planar shape 102. In some embodiments, the hydrated inorganic oxide materials 100 may be capable of elongating 110 to a fiber shape 104 that is at least about 25 times greater in the thickness direction 106 than the planar shape 102. Further, the radial dimension 108, which is defined based on the planar shape 102, of the hydrated inorganic oxide materials 100 may change by less than about 10% during elongation 110. As used herein, the term "planar shape" refers to and inorganic swellable material in its thinnest form. As used herein, the term "fiber shape" refers to an elongated hydrated inorganic oxide material but does not imply a degree of elongation (i.e., does not imply elongation to the greatest possible thickness of hydrated inorganic oxide material).

In contrast, swellable clay materials, such as bentonite particles, undergo some degree of swelling in all directions because the platelets are, to some degree, randomly oriented. Further, the amount of swelling in such swellable clay materials can be on the order of an about 5 to about 15 times increase in volume. Therefore, the swelling from a planar shape to a fiber shape of the hydrated inorganic oxide materials described herein is different than that of more traditional swellable clay materials and provides for unique advantages and applications. For example, the fiber shape described herein may, in some instances, allow for an enhanced suspendability of the hydrated inorganic oxide materials as compared to typical swellable clay materials. In another example, the fiber shape described herein may, in some instances, allow for an increased viscosity for the same or a lower concentration of the hydrated inorganic oxide materials in a wellbore fluid as compared to the typical swellable clay materials.

It should be noted that when the term "about" is used in front of a series of numerical values, about modifies each of the values. It should be noted that in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Examples of hydrated inorganic oxide materials described herein may include $H_{1.07}Ti_{1.73}O_4 \cdot H_2O$, $H_2Cs_4W_{11}O_{36} \cdot 6H_2O$, $HCa_2Nb_3O_{10} \cdot 1.5H_2O$, $HCa_2NaNb_4O_{13} \cdot 1.5H_2O$, $H_{0.8}[Ti_{1.2}Fe_{0.8}]O_4 \cdot H_2O$, and the like, and any combination thereof.

In the planar shape, the hydrated inorganic oxide materials described herein may have a thickness ranging from a lower limit of about 1 micron, 2 microns, or 3 microns to an upper limit of about 5 microns, 4 microns, or 3 microns, and wherein the thickness of the planar shape may range from any lower limit to any upper limit and encompasses any subset therebetween.

Swelling or elongating hydrated inorganic oxide material may be achieved by contacting the hydrated inorganic oxide material with a polar amine compound. Amines suitable for inducing swelling include amino alcohols, amino thiols, amino amides, amino ketones, substituted thioalcohols, substituted ether alcohols, and the like, and any combination thereof. Examples of polar amine compounds may include, but are not limited to, 2-(dimethylamino ethanol), 3-dimethylamino-1-propanol, 4-amino-1-butanol, ethanolamine, propanol amine, 2-methylamino ethanol, 3-amino-1-propanol, amino-2-propanol, alaninol, 2-amino-1-butanol, 2-amino-2-methyl-1-propanol, diethanolamine, 1-dimethylamino-2-propanol, 2-dimethylamino ethanethiol, 3-amino-1-propanethiol, 3-dimethylamino propanethiol, 4-amino butanethiol, 2-methoxyethylamine, 1-methoxy-2-propylamine, 3-methoxypropylamine, 2-amino-1,3-propanediol, 1,3-diamino-2-propanol, 2-methylaminomethyl-1,3-dioxolane, triethanolamine, and the like, any derivative thereof, and any combination thereof.

Swelling of the hydrated inorganic oxide material may yield a fiber shape having a thickness ranging from a lower limit of about 10 microns, 25 microns, 50 microns, or 100 microns to an upper limit of about 500 microns, 400 microns, 300 microns, 250 microns, or 200 microns, and wherein the thickness of the fiber shape may range from any lower limit to any upper limit and encompasses any subset therebetween. In some instances, the fiber shape may have the thickness relative to the planar shape that ranges from a lower limit of about 10 times greater, 25 times greater, or 50 times greater to an upper limit of about 150 times greater, 100 times greater, or 50 times greater, and wherein the thickness of the fiber shape relative to the planar shape may range from any lower limit to any upper limit and encompasses any subset therebetween. The thickness of the fiber shape and/or the thickness of the fiber shape relative to the planar shape may, in some instances, depending on, inter alia, the concentration of the polar amine compound, the composition of the polar amine compound, the composition of the hydrated inorganic oxide material, and the pH of the aqueous base fluid.

After being elongated, the hydrated inorganic oxide materials described herein may, in some instances, be capable of contracting or shrinking in the thickness direction. In some instances, contracting or shrinking may involve contacting the hydrated inorganic oxide material in a fiber shape with an acid. Examples of suitable acids may include, but are not limited to, hydrochloric acid, hydrofluoric acid, sulfuric acid, nitric acid, formic acid, acetic acid, toluenesulfonic acid, citric acid, uric acid, oxalic acid, lactic acid, formic acid, methyl lactate, ethyl lactate, propyl lactate, methyl formate, ethyl formate, propyl formate, diformate esters, dilactate esters, and the like, any derivative thereof, and any combination thereof.

In some instances, contracting or shrinking may be to the planar shape (i.e., the smallest thickness). In some instances, the contracting or shrinking may be from a first fiber shape to a second fiber shape, wherein the second fiber shape has a smaller thickness in the first fiber shape. Shrinking of the hydrated inorganic oxide material may yield a hydrated inorganic oxide material having a thickness ranging from a lower limit of about 1 microns, 3 microns, 5 microns, 10 microns, 25 microns, 50 microns, or 100 microns to an upper limit of about 250 microns, 200 microns, 100 microns, 50 microns, 10 microns, or 5 microns, and wherein the thickness of the hydrated inorganic oxide material may range from any lower limit to any upper limit and encompasses any subset therebetween. In some instances, the hydrated inorganic oxide material may have the thickness relative to the fiber shape (or first fiber shape) that ranges from a lower limit of about 10 times less, 25 times less, or 50 times less to an upper limit of about 150 times less, 100 times less, or 50 times less, and wherein the thickness of the hydrated inorganic oxide material relative to the fiber shape (or first fiber shape) may range from any lower limit to any upper limit and encompasses any subset therebetween. The thickness of the hydrated inorganic oxide material after shrinking may, in some instances, depending on, inter alia, the concentration of the acid, the composition of the acid, and the composition of the hydrated inorganic oxide material.

In some embodiments, swelling and shrinking the hydrated inorganic oxide materials may occur more than once. Without being limited by theory, it is believed that swelling the hydrated inorganic oxide materials may increase the viscosity of a wellbore fluid, and shrinking the hydrated inorganic oxide materials may reduce the viscosity of the wellbore fluid. This may allow for changes to the viscosity of the wellbore fluid in situ (e.g., reducing the viscosity to place particles in a desired location, increasing the viscosity (even to a gel-like viscosity) to plug permeable portions of a formation or particle pack, decreasing the viscosity to return permeability to portions of a formation or particle pack, and the like). Further, the ability to change the thickness of the hydrated inorganic oxide materials may be useful in the formation and removal of filter cakes and wellbore strengthening operations (e.g., operations to increase the mud weight window).

Some embodiments may involve introducing a wellbore fluid described herein (i.e., comprising an aqueous base fluid and a hydrated inorganic oxide material) into a wellbore penetrating a subterranean formation; and swelling the hydrated inorganic oxide material by contacting the hydrated inorganic oxide material with a polar amine compound. In some instances, swelling may occur before introduction of the wellbore fluid into the wellbore. In some instances, a second wellbore fluid comprising the polar amine compound may be introduced into the wellbore so as to contact and swell the hydrated inorganic oxide material that was previously placed in the wellbore. Some embodiments may further involve (after swelling the hydrated inorganic oxide material) shrinking the hydrated inorganic oxide material by contacting the hydrated inorganic oxide material with an acid (e.g., a wellbore fluid comprising an acid).

In some embodiments, the wellbore fluid may further comprise a plurality of particles (e.g., gravel particles or proppant particles). Some embodiments may involve introducing a wellbore fluid comprising an aqueous base fluid, a hydrated inorganic oxide material in a fiber shape, a polar amine compound, and a plurality of particles into a wellbore penetrating a subterranean formation; and forming a particle pack (e.g., a gravel pack or a proppant pack) in a portion of the wellbore, a portion of the subterranean formation, or both. Some instances may further involve contacting the wellbore fluid after forming the particle pack with an acid so as to reduce a thickness of the hydrated inorganic oxide material. Reducing the thickness of hydrated inorganic oxide material may reduce the viscosity of the wellbore fluid and allow for the aqueous base fluid and hydrated inorganic oxide material to flow from the particulate pack, which increases the fluid permeability of the particulate pack.

Some embodiments may involve introducing in series (e.g., immediate succession) a first wellbore fluid, a second wellbore fluid (e.g., a spacer fluid) that comprises an aqueous base fluid, a hydrated inorganic oxide material in a fiber shape, a polar amine compound, and optionally a plurality of particles (e.g., weighting agent particles), and a third wellbore fluid into a wellbore penetrating a subterranean formation. As referred to herein, the term "spacer fluid" will be understood to mean a fluid placed within a wellbore to separate other fluids (e.g., to separate a drilling fluid within the wellbore from a cement composition that subsequently will be placed within the wellbore). Spacer fluids generally prevent or mitigate mixing of the fluids on either side of the spacer fluid.

Some embodiments may involve introducing a wellbore fluid that comprises an aqueous base fluid, a hydrated inorganic oxide material in a fiber shape, a polar amine compound, and optionally a plurality of particles (e.g., weighting agent particles) into a wellbore penetrating a subterranean formation; and drilling at least a portion of the wellbore while circulating the wellbore fluid. In some instances, the hydrated inorganic oxide material in fiber form may viscosity the wellbore fluid and assist in transporting cuttings produced during drilling to the surface.

Some embodiments may involve introducing a wellbore fluid that comprises an aqueous base fluid, a hydrated inorganic oxide material in a fiber shape, a polar amine compound, and optionally a plurality of particles (e.g., weighting agent particles) into a wellbore penetrating a subterranean formation; drilling at least a portion of the wellbore while circulating the wellbore fluid; and forming a filter cake in the wellbore (e.g., along a portion of a wall of the wellbore), wherein the filter cake comprises the hydrated inorganic oxide material. Some embodiments may further involve removing at least a portion of the filter cake by contacting the portion of the filter cake with an acid. Without being limited by theory, by shrinking the hydrated inorganic oxide material by contacting with acid, the integrity of the filter cake may be compromised to some degree, which may enhance removal of the filter cake.

Some embodiments may involve introducing a wellbore fluid comprising an aqueous base fluid and a hydrated inorganic oxide material into a wellbore penetrating a subterranean formation; placing the hydrated inorganic oxide material into a portion of the subterranean formation; swelling the hydrated inorganic oxide material after placing by contacting the hydrated inorganic oxide material with a polar amine compound (e.g., introducing a second wellbore fluid comprising the polar amine compound into the portion of the subterranean formation), thereby reducing fluid flow between the wellbore and the portion of the subterranean formation. In some embodiments, while fluid flow is reduced, another wellbore fluid may be introduced into the wellbore and substantially diverted from entering the portion of the subterranean formation. Some embodiments may further involve, after swelling, shrinking the hydrated inorganic oxide material by contact the hydrated inorganic oxide material with an acid (e.g., introducing a third wellbore fluid comprising the acid into the portion of the subterranean formation), thereby increasing fluid flow between the wellbore and the portion of the subterranean formation.

Some embodiments may involve introducing a wellbore fluid that comprises an aqueous base fluid and a hydrated inorganic oxide material (and optionally a lost circulation material (e.g., walnut shells, ground marble, resilient carbon-based materials, and the like) into a wellbore penetrating a subterranean formation; placing at least portion of the hydrated inorganic oxide material into a plurality of microfractures extending from the wellbore; then, swelling the hydrated inorganic oxide material by contacting the hydrated inorganic oxide material with a polar amine compound, thereby strengthening the wellbore; and then drilling a portion of the wellbore. As used herein, the term "strengthening the wellbore" refers to increasing the bore wall stress the wellbore can withstand before fracturing.

In some instances, the hydrated inorganic oxide material may be introduced into the wellbore and placed in the microfractures in fiber form (i.e., swelling the hydrated inorganic oxide material before introducing into the wellbore). In some instances, a hybrid of the foregoing may include swelling before and after introduction into the wellbore. Without being limited by theory, it is believed that a thinner (not necessarily thinnest) form of the hydrated inorganic oxide material may be able to more readily incorporate or be placed into microfractures and then plug said microfractures upon swelling to a thicker form.

In various embodiments, systems configured for delivering the wellbore fluids described herein to a downhole location are described. In various embodiments, the systems can comprise a pump fluidly coupled to a tubular, the tubular containing a wellbore fluid comprising an aqueous base fluid and a hydrated inorganic oxide material described herein (and optionally further comprising each of a polar amine compound and a plurality of particles).

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the wellbore fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the wellbore fluid to the high pressure pump. In such embodiments, the low pressure pump may "step up" the pressure of the wellbore fluid before it reaches the high pressure pump.

In some embodiments, the systems described herein can further comprise a mixing tank that is upstream of the pump and in which the wellbore fluid is formulated. In various embodiments, the pump (e.g., a low pressure pump, a high pressure pump, or a combination thereof) may convey the wellbore fluid from the mixing tank or other source of the wellbore fluid to the tubular. In other embodiments, however, the wellbore fluid can be formulated offsite and transported to a worksite, in which case the wellbore fluid may be introduced to the tubular via the pump directly from its shipping container (e.g., a truck, a railcar, a barge, or the like) or from a transport pipeline. In either case, the wellbore fluid may be drawn into the pump, elevated to an appropriate pressure, and then introduced into the tubular for delivery downhole.

Figure 2:
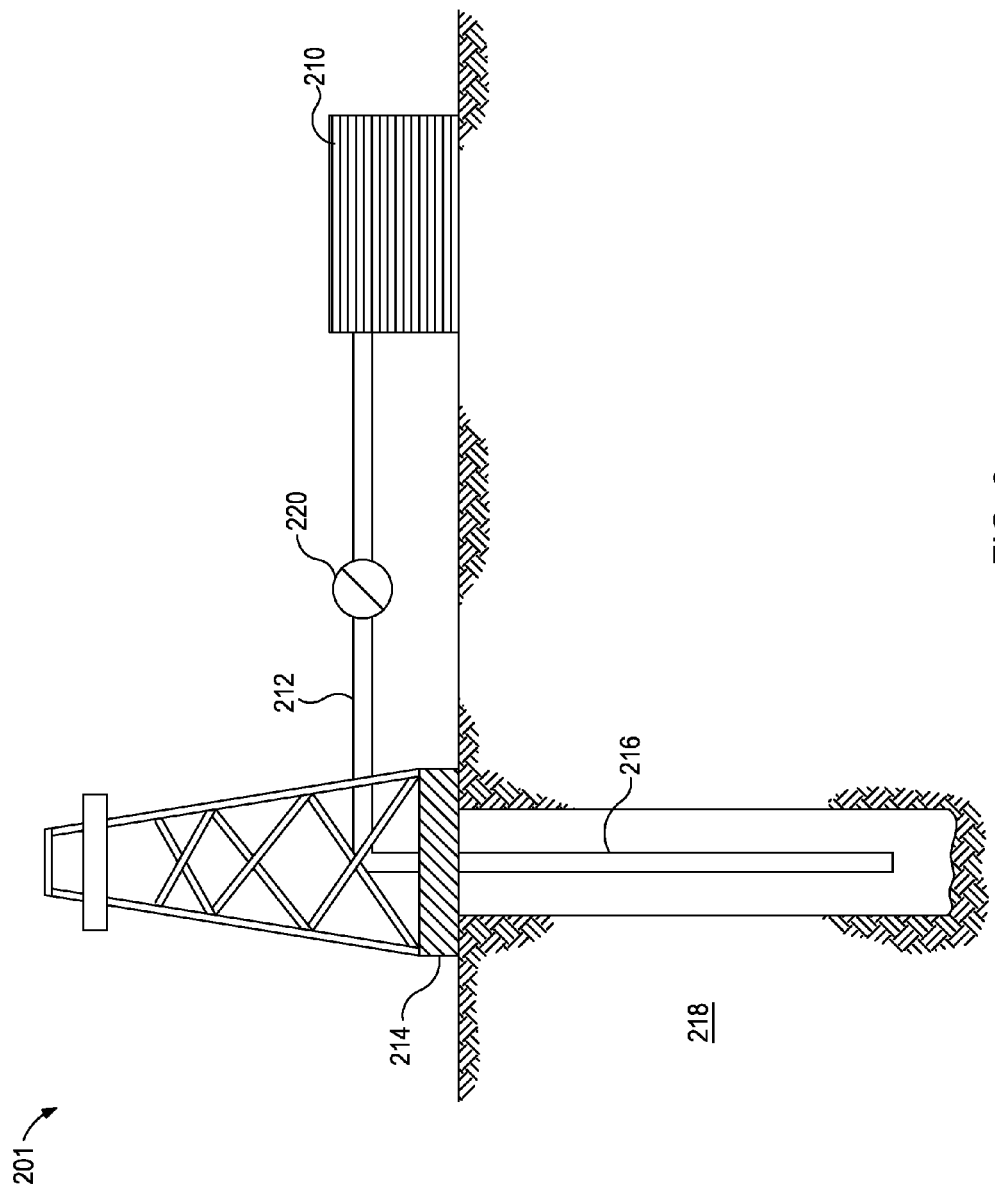
FIG. 2 shows an illustrative schematic of a system that can deliver wellbore fluids described herein to a downhole location, according to one or more embodiments.

FIG. 2 shows an illustrative schematic of a system that can deliver wellbore fluids of the present invention to a downhole location, according to one or more embodiments. It should be noted that while FIG. 2 generally depicts a land-based system, it is to be recognized that like systems may be operated in subsea locations as well. As depicted in FIG. 2, system 201 may include mixing tank 210, in which a wellbore fluid of the present invention may be formulated. The wellbore fluid may be conveyed via line 212 to wellhead 214, where the wellbore fluid enters tubular 216, tubular 216 extending from wellhead 214 into subterranean formation 218. Upon being ejected from tubular 216, the wellbore fluid may subsequently penetrate into subterranean formation 218. Pump 220 may be configured to raise the pressure of the wellbore fluid to a desired degree before its introduction into tubular 216. It is to be recognized that system 201 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the wellbore fluid may, in some embodiments, flow back to wellhead 214 and exit subterranean formation 218. In some embodiments, the wellbore fluid that has flowed back to wellhead 214 may subsequently be recovered and recirculated to subterranean formation 218.

It is also to be recognized that the disclosed wellbore fluids may also directly or indirectly affect the various downhole equipment and tools that may come into contact with the wellbore fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

Figure 3:
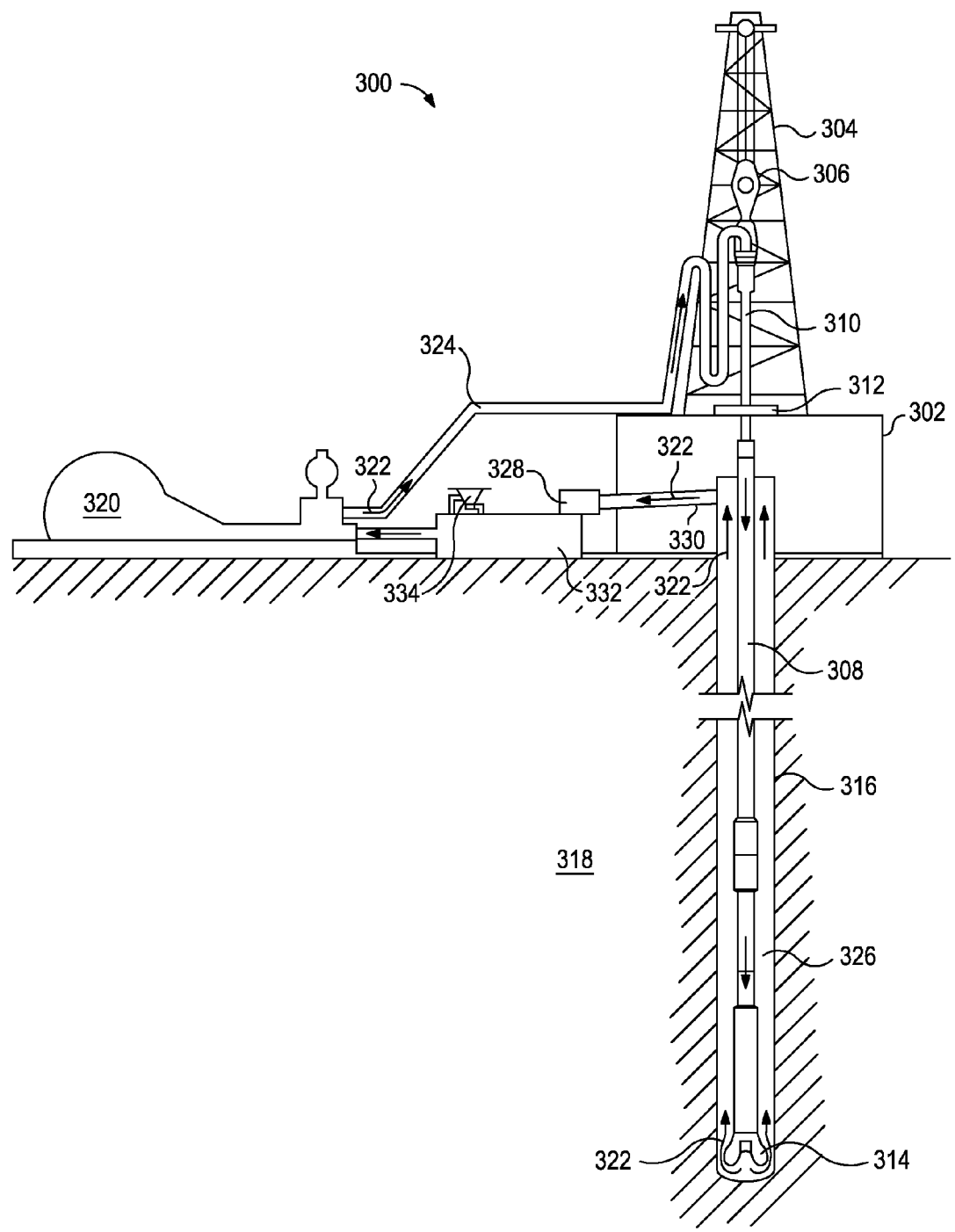
FIG. 3 shows an illustrative schematic of a system for drilling a wellbore penetrating a subterranean formation with the wellbore fluids described herein, according to one or more embodiments.

In various embodiments, systems configured for drilling wellbores with the wellbore fluids described herein are described. The exemplary wellbore fluids described herein (e.g., comprising an aqueous base fluid and a hydrated inorganic oxide material described herein (and optionally further comprising each of a polar amine compound and a plurality of particles)) may directly or indirectly affect one or more components or pieces of equipment associated with the preparation, delivery, recapture, recycling, reuse, and/or disposal of the disclosed wellbore fluids. For example, and with reference to FIG. 3, the disclosed wellbore fluids and hydrated inorganic oxide materials may directly or indirectly affect one or more components or pieces of equipment associated with an exemplary wellbore drilling assembly 300, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 300 may include a drilling platform 302 that supports a derrick 304 having a traveling block 306 for raising and lowering a drill string 308. The drill string 308 may include, but is not limited to, drill pipe and coiled tubing, as generally known to those skilled in the art. A kelly 310 supports the drill string 308 as it is lowered through a rotary table 312. A drill bit 314 is attached to the distal end of the drill string 308 and is driven either by a downhole motor and/or via rotation of the drill string 308 from the well surface. As the bit 314 rotates, it creates a borehole 316 that penetrates various subterranean formations 318.

A pump 320 (e.g., a mud pump) circulates drilling fluid 322 (also referred to herein as a wellbore fluid) through a feed pipe 324 and to the kelly 310, which conveys the drilling fluid 322 downhole through the interior of the drill string 308 and through one or more orifices in the drill bit 314. The drilling fluid 322 is then circulated back to the surface via an annulus 326 defined between the drill string 308 and the walls of the borehole or wellbore 316. At the surface, the recirculated or spent drilling fluid 322 exits the annulus 326 and may be conveyed to one or more fluid processing unit(s) 328 via an interconnecting flow line 330. After passing through the fluid processing unit(s) 328, a "cleaned" drilling fluid 322 is deposited into a nearby retention pit 332 (i.e., a mud pit). While illustrated as being arranged at the outlet of the wellbore 316 via the annulus 326, those skilled in the art will readily appreciate that the fluid processing unit(s) 328 may be arranged at any other location in the drilling assembly 300 to facilitate its proper function, without departing from the scope of the scope of the disclosure.

One or more of the disclosed hydrated inorganic oxide materials may be added to the drilling fluid 322 via a mixing hopper 334 communicably coupled to or otherwise in fluid communication with the retention pit 332. The mixing hopper 334 may include, but is not limited to, mixers and related mixing equipment known to those skilled in the art. In other embodiments, however, the disclosed hydrated inorganic oxide materials may be added to the drilling fluid 322 at any other location in the drilling assembly 300. In at least one embodiment, for example, there could be more than one retention pit 332, such as multiple retention pits 332 in series. Moreover, the retention pit 332 may be representative of one or more fluid storage facilities and/or units where the disclosed hydrated inorganic oxide materials may be stored, reconditioned, and/or regulated until added to the drilling fluid 322.

As mentioned above, the disclosed hydrated inorganic oxide materials may directly or indirectly affect the components and equipment of the drilling assembly 300. For example, the disclosed hydrated inorganic oxide materials may directly or indirectly affect the fluid processing unit(s) 328 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 328 may further include one or more sensors, gauges, pumps, compressors, and the like used to store, monitor, regulate, and/or recondition the exemplary hydrated inorganic oxide materials.

The disclosed hydrated inorganic oxide materials may directly or indirectly affect the pump 320, which representatively includes any conduits, pipelines, trucks, tubulars, and/or pipes used to fluidically convey the hydrated inorganic oxide materials downhole, any pumps, compressors, or motors (e.g., topside or downhole) used to drive the hydrated inorganic oxide materials into motion, any valves or related joints used to regulate the pressure or flow rate of the hydrated inorganic oxide materials, and any sensors (i.e., pressure, temperature, flow rate, etc.), gauges, and/or combinations thereof, and the like. The disclosed hydrated inorganic oxide materials may also directly or indirectly affect the mixing hopper 334 and the retention pit 332 and their assorted variations.

The disclosed hydrated inorganic oxide materials may also directly or indirectly affect the various downhole equipment and tools that may come into contact with the hydrated inorganic oxide materials such as, but not limited to, the drill string 308, any floats, drill collars, mud motors, downhole motors and/or pumps associated with the drill string 308, and any MWD/LWD tools and related telemetry equipment, sensors or distributed sensors associated with the drill string 308. The disclosed hydrated inorganic oxide materials may also directly or indirectly affect any downhole heat exchangers, valves and corresponding actuation devices, tool seals, packers and other wellbore isolation devices or components, and the like associated with the borehole 316. The disclosed hydrated inorganic oxide materials may also directly or indirectly affect the drill bit 314, which may include, but is not limited to, roller cone bits, PDC bits, natural diamond bits, any hole openers, reamers, coring bits, etc.

While not specifically illustrated herein, the disclosed hydrated inorganic oxide materials may also directly or indirectly affect any transport or delivery equipment used to convey the hydrated inorganic oxide materials to the drilling assembly 300 such as, for example, any transport vessels, conduits, pipelines, trucks, tubulars, and/or pipes used to fluidically move the hydrated inorganic oxide materials from one location to another, any pumps, compressors, or motors used to drive the hydrated inorganic oxide materials into motion, any valves or related joints used to regulate the pressure or flow rate of the hydrated inorganic oxide materials, and any sensors (i.e., pressure and temperature), gauges, and/or combinations thereof, and the like.

Embodiments disclosed herein include:

A. a method that includes introducing a wellbore fluid comprising an aqueous base fluid and a hydrated inorganic oxide material into a wellbore penetrating a subterranean formation; and swelling the hydrated inorganic oxide material by contacting the hydrated inorganic oxide material with a polar amine compound such that the hydrated inorganic oxide material elongates from a planar shape to a fiber shape along a thickness direction of the planar shape;

B. a method that includes introducing a wellbore fluid comprising an aqueous base fluid and a hydrated inorganic oxide material into a wellbore penetrating a subterranean formation; and swelling the hydrated inorganic oxide material by contacting the hydrated inorganic oxide material with a polar amine compound such that the hydrated inorganic oxide material elongates from a planar shape to a fiber shape along a thickness direction of the planar shape, wherein the fiber shape is at least about 25 times greater in the thickness direction than the planar shape, and wherein during elongating a radial dimension of the hydrated inorganic oxide material changes by less than about 10%; and C. a method that includes introducing a wellbore fluid comprising an aqueous base fluid and a hydrated inorganic oxide material into a wellbore penetrating a subterranean formation; and swelling the hydrated inorganic oxide material by contacting the hydrated inorganic oxide material with a polar amine compound such that the hydrated inorganic oxide material elongates from a planar shape to a fiber shape along a thickness direction of the planar shape, wherein the hydrated inorganic oxide material comprises at least one selected from the group consisting of $H_{1.07}Ti_{1.73}O_4 \cdot H_2O$, $H_2Cs_4W_{11}O_{36} \cdot 6H_2O$, $HCa_2Nb_3O_{10} \cdot 1.5H_2O$, $HCa_2NaNb_4O_{13} \cdot 1.5H_2O$, $H_{0.8}[Ti_{1.2}Fe_{0.8}]O_4 \cdot H_2O$, and any combination thereof, and wherein the polar amine compound comprises at least one selected from the group consisting of an amino alcohol, an amino thiol, an amino amide, an amino ketone, a substituted thioalcohol, a substituted ether alcohol, and any combination thereof.

Each of embodiments A, B, and C may have one or more of the following additional elements in any combination (unless already provided for): Element 1: wherein the fiber shape is at least about 25 times greater in the thickness direction than the planar shape; Element 2: wherein the fiber shape is about 50 times to about 150 times greater in the thickness direction than the planar shape; Element 3: wherein during swelling a radial dimension of the hydrated inorganic oxide material changes by less than about 10%; Element 4: wherein the hydrated inorganic oxide material comprises at least one selected from the group consisting of $H_{1.07}Ti_{1.73}O_4 \cdot H_2O$, $H_2Cs_4W_{11}O_{36} \cdot 6H_2O$, $HCa_2Nb_3O_{10} \cdot 1.5H_2O$, $HCa_2NaNb_4O_{13} \cdot 1.5H_2O$, $H_{0.8}[Ti_{1.2}Fe_{0.8}]O_4 \cdot H_2O$, and any combination thereof; Element 5: wherein the polar amine compound comprises at least one selected from the group consisting of an amino alcohol, an amino thiol, an amino amide, an amino ketone, a substituted thioalcohol, a substituted ether alcohol, and any combination thereof; Element 6: wherein the wellbore fluid further comprises a plurality of particulates; Element 7: the method further includes shrinking the hydrated inorganic oxide material by contacting the hydrated inorganic oxide material with an acid, wherein shrinking is performed after swelling; Element 8: Element 7 wherein after shrinking the hydrated inorganic oxide material has a thickness of about 10 times to about 150 times less than before contacting with the acid; Element 9: wherein the swelling occurs before introducing the wellbore fluid into the wellbore; Element 10: Element 9 wherein the method further includes drilling at least a portion of the wellbore while circulating the wellbore fluid; Element 11: Element 10 wherein the method further includes forming a filter cake in the wellbore, wherein the filter cake comprises the hydrated inorganic oxide material; Element 12: Element 9 wherein the wellbore fluid is a spacer fluid and wherein the method further includes introducing a second wellbore fluid immediately before the spacer fluid and introducing a third wellbore fluid immediately after the spacer fluid; Element 13: Element 9 wherein the wellbore fluid further comprises a plurality of gravel particulates and wherein the method further includes forming a gravel pack in a portion of the wellbore; Element 14: wherein the swelling occurs after introducing the wellbore fluid into the wellbore; Element 15: Element 14 wherein the method further includes placing at least a portion of the hydrated inorganic oxide material in a portion of the subterranean formation and then performing the swelling step, thereby reducing fluid flow between the wellbore and the portion of the subterranean formation; Element 16: Element 15 wherein the method further includes then shrinking the hydrated inorganic oxide material by contacting the hydrated inorganic oxide material with an acid, thereby increasing fluid flow between the wellbore and the portion of the subterranean formation; and Element 17: Element 14 wherein the method further includes placing at least a portion of the hydrated inorganic oxide material in a plurality of microfractures extending from the wellbore, then performing the swelling step, thereby strengthening the wellbore, and then drilling a portion of the wellbore.

By way of non-limiting example, exemplary combinations applicable to A, B, C include: Element 1 in combination with Element 3; Element 2 in combination with Element 3; Element 4 in combination with Element 5; Element 1 in combination with Element 5; Element 2 in combination with Element 5; Element 6 in combination with Element 1 or 2 and Element 3; Element 6 in combination with Element 4; Element 6 in combination with Element 7; Element 6 in combination with Element 9; Element 6 in combination with Element 14; one of Elements 9-17 in combination with any of the foregoing; and Element 16 in combination with Elements 7-8.

Another embodiment includes a system for performing the introducing step of Embodiments A-C, wherein the system comprises a pump fluidly coupled to a tubular extending into the wellbore penetrating the subterranean formation.

Another embodiment includes a treatment fluid comprising an aqueous base fluid; and a hydrated inorganic oxide material capable of elongating from a planar shape to a fiber shape along a thickness direction of the planar shape, wherein the fiber shape is at least about 25 times greater in the thickness direction than the planar shape, and wherein during elongating a radial dimension of the hydrated inorganic oxide material changes by less than about 10%. Exemplary combinations of Elements applicable to such an embodiment may include, but are not limited to, Element 1 in combination with Element 3; Element 2 in combination with Element 3; Element 4 in combination with Element 5; Element 1 in combination with Element 5; Element 2 in combination with Element 5; Element 6 in combination with Element 1 or 2 and Element 3; and Element 6 in combination with Element 4.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
introducing a wellbore fluid comprising an aqueous base fluid and a hydrated inorganic oxide into a wellbore penetrating a subterranean formation; and swelling the hydrated inorganic oxide by contacting the hydrated inorganic oxide with a polar amine compound such that the hydrated inorganic oxide elongates along a thickness direction of the hydrated inorganic oxide.

2. The method of claim 1, wherein during swelling the thickness direction of the hydrated inorganic oxide increases by at least 25 times.

3. The method of claim 1, wherein during swelling a radial dimension of the hydrated inorganic oxide changes by less than about 10%.

4. The method of claim 1, wherein the hydrated inorganic oxide is at least one selected from the group consisting of $H_{1.07}Ti_{1.73}O_4 \cdot H_2O$, $H_2Cs_4W_{11}O_{36} \cdot 6H_2O$, $HCa_2Nb_3O_{10} \cdot 1.5H_2O$, $HCa_2NaNb_4O_{13} \cdot 1.5H_2O$, $H_{0.8}[Ti_{1.2}Fe_{0.8}]O_4$, $H_2O$, and any combination thereof.

5. The method of claim 1, wherein the polar amine compound comprises at least one selected from the group consisting of an amino alcohol, an amino thiol, an amino amide, an amino ketone, a substituted thioalcohol, a substituted ether alcohol, and any combination thereof.

6. The method of claim 1, wherein the wellbore fluid further comprises a plurality of particulates.

7. The method of claim 1 further comprising:
shrinking the hydrated inorganic oxide by contacting the hydrated inorganic oxide with an acid, wherein shrinking is performed after swelling.

8. The method of claim 1, wherein the swelling occurs before introducing the wellbore fluid into the wellbore.

9. The method of claim 8 further comprising:
drilling at least a portion of the wellbore while circulating the wellbore fluid.

10. The method of claim 9 further comprising:
forming a filter cake in the wellbore, wherein the filter cake comprises the hydrated inorganic oxide.

11. The method of claim 8 further comprising:
wherein the wellbore fluid is a spacer fluid;
introducing a second wellbore fluid immediately before the spacer fluid; and
introducing a third wellbore fluid immediately after the spacer fluid.

12. The method of claim 8 further comprising:
wherein the wellbore fluid further comprises a plurality of gravel particulates; and
forming a gravel pack in a portion of the wellbore.

13. The method of claim 1, wherein the swelling occurs after introducing the wellbore fluid into the wellbore.

14. The method of claim 13 further comprising:
placing at least a portion of the hydrated inorganic oxide in a portion of the subterranean formation; and
then performing the swelling step, thereby reducing fluid flow between the wellbore and the portion of the subterranean formation.

15. The method of claim 14 further comprising:
then shrinking the hydrated inorganic oxide by contacting the hydrated inorganic oxide with an acid, thereby increasing fluid flow between the wellbore and the portion of the subterranean formation.

16. The method of claim 13 further comprising:
placing at least a portion of the hydrated inorganic oxide in a plurality of microfractures extending from the wellbore;
then performing the swelling step, thereby strengthening the wellbore; and
then drilling a portion of the wellbore.

17. The method of claim 1, wherein swelling the hydrated inorganic oxide increases a viscosity of the wellbore fluid, and wherein the method further comprises: shrinking the hydrated inorganic oxide by contacting the hydrated inorganic oxide with an acid, wherein shrinking is performed after swelling and upon shrinking the viscosity of the wellbore fluid decreases.

18. A method comprising:
introducing a wellbore fluid comprising an aqueous base fluid and a hydrated inorganic oxide into a wellbore penetrating a subterranean formation; and
swelling the hydrated inorganic oxide by contacting the hydrated inorganic oxide with a polar amine compound such that the hydrated inorganic oxide elongates along a thickness direction of the hydrated inorganic oxide wherein during elongating a radial dimension of the hydrated inorganic oxide changes by less than about 10% and the thickness direction of the hydrated inorganic oxide increases by at least 25 times.

19. The method of claim 18 further comprising:
shrinking the hydrated inorganic oxide by contacting the hydrated inorganic oxide with an acid, wherein shrinking is performed after swelling.

* * * * *